Patented May 23, 1939

2,159,370

UNITED STATES PATENT OFFICE 2,159,370

MANUFACTURE OF NUCLEAR ALKYLATED ANILINES

Robert R. Dreisbach, Midland, Mich., assignor to The Dow Chemical Company, Midland, Mich., a corporation of Michigan No Drawing. Application March 29, 1937, Serial No. 133,644

10 Claims. (Cl. 260—581)

This invention concerns a method for manufacturing nuclear alkylated anilines, particularly meta-alkyl-anilines.

Although ortho- and para-alkyl-anilines may conveniently be prepared by nitrating an alkylbenzene to obtain a mixture of ortho- and para-nitro-alkylbenzenes and reducing such nitro compounds, the method heretofore known for the production of a meta-alkyl-aniline is unsatisfactory from a manufacturing view-point. Briefly the known method for making a meta-alkyl-aniline involves preparing a para-alkyl-aniline by the procedure just stated, consecutively acetylating and nitrating the para-alkyl-aniline to obtain a 2-nitro-4-alkyl-acetanilide, hydrolyzing the latter to the corresponding 2-nitro-4-alkyl-aniline, removing the amino group by diazotization and reduction to form a meta-nitro-alkylbenzene, and reducing the latter. The large number of steps and chemical agents required in this process render the same unsuited to commercial practice.

An object of the present invention is to provide a simple method whereby a monoalkyl- or polyalkyl-aniline having an alkyl radical in meta position relative to the amino group may be manufactured economically and in good yield.

I have found that a nuclear alkylated aniline having an alkyl radical meta to the amino-group, e. g. meta-ethyl-aniline, 3,5-diethyl-aniline, etc., may be prepared readily and in good yield by consecutively alkylating and ammonolyzing a halobenzene.

The alkylation is carried out by reacting a halobenzene, such as bromobenzene or chlorobenzene, with an olefine or alkyl halide in the presence of a Friedel-Craft catalyst, such as aluminum chloride, aluminum bromide, ferric chloride, etc. Among the various olefines and alkyl halides which may be employed in the reaction are ethylene, propylene, butylene, isobutylene, amylene, diisobutylene, ethyl chloride, propyl chloride, isopropyl bromide, normal butyl bromide, secondary butyl chloride, tertiary butyl chloride, etc. The reaction is usually carried out by adding the olefine or alkyl halide gradually to a mixture of the halobenzene and between 0.05 and 5 per cent its weight of the catalyst while stirring and maintaining the mixture at a reaction temperature between 0° and 100° C. When a monoalkyl-halobenzene is desired, the olefine or alkyl halide is added in amount representing between about 0.5 and 1.3 the molecular equivalent of the halobenzene. When a polyalkyl-halobenzene is desired, the olefine or alkyl halide reactant is added in greater proportion. After completing this reaction, the catalyst is removed or rendered inactive, e. g. by washing with an aqueous solution of an alkali or mineral acid, etc., and the mixture is distilled to separate the desired alkylated halobenzene product. The latter is usually a mixture of isomeric compounds, but is, in all instances, rich in an isomer having an alkyl group meta to the halogen atom. For instance, the mixture of isomeric monoalkyl-halobenzenes obtained by such reaction usually contains about 80 per cent of the meta-isomer and about 20 per cent of the ortho-compound. For practical reasons, the isomeric mixture is usually employed in the subsequent ammonolysis reaction, although the isomers can frequently be separated by careful fractional distillation and the purified meta-isomer may be employed in the ammonolysis.

The monoalkyl- or polyalkyl-halobenzene intermediate product, prepared as just described and comprising a compound having an alkyl group meta to the halogen substituent, is reacted with ammonia to form the alkylated aniline product. The reaction is carried out under pressure at elevated temperatures in the presence of a substantially inert solvent, e. g. water or alcohol. Ordinarily, water and ammonia are employed in the form of an aqueous ammonia solution of concentration greater than 15 per cent by weight and preferably between 25 and 35 per cent. Copper or a copper compound such as cuprous oxide, cuprous chloride, cupric chloride, etc., is preferably employed as a catalyst, but the ammonolysis can be carried out smoothly in the absence of such catalyst. Between 1 and 20 mols, preferably between 5 and 10 mols, of ammonia and between 0.03 and 0.15 chemical equivalent of a copper compound as catalyst are usually employed per mol of the alkylated halobenzene, but other proportions can be used if desired, The temperature required for the reaction varies somewhat depending on the particular reactants employed and the presence or absence of a catalyst. For instance, the reaction between aqueous ammonia and an alkyl-chlorobenzene is usually carried out at temperatures above 150° C. and occurs most smoothly when carried out in the presence of a catalyst at temperatures between 175° and 250° C. The reaction between ammonia and an alkyl-bromobenzene may be carried out at somewhat lower temperatures. During heating under the conditions just stated, samples of the mixture may be withdrawn periodically and analyzed for inorganic halides to determine the extent of reaction.

When the reaction is completed, the reactor is cooled and the charge removed. The alkylated aniline product may be separated in any of the usual ways, e. g. by steam distilling the product from the crude reacted mixture, separating the organic layer of the distillate, and fractionally distilling the same. The alkylated aniline product corresponds to the alkylated halobenzene subjected to the ammonolysis, i. e. when an individual meta-alkyl-halobenzene is ammonolyzed the product is an individual meta-alkyl-aniline and when a mixture of isomeric alkyl-halobenzenes is ammonolyzed the product is a mixture of the corresponding isomeric alkyl-anilines comprising of course an isomer containing an alkyl radical meta to the amino group. For instance, the product obtained by the ammonolysis of a mixture of ortho- and meta-alkyl-halobenzenes is a mixture of the corresponding ortho- and meta-alkyl-anilines. The meta isomers may be separated by acetylating the mixture, fractionally crystallizing the acetylated products from water or organic solvents to separate the meta-alkyl-acetanilide, and then hydrolyzing the latter to recover the meta-alkyl-aniline as the individual compound.

The following examples illustrate a number of ways in which the principle of the invention has been applied, but are not to be construed as limiting the invention.

*Example 1*

Approximately 11 pounds (0.39 mol) of ethylene was passed into a mixture of 30 pounds 6 ounces (0.27 mol) of chlorobenzene and 2 pounds (0.015 mol) of aluminum chloride in a period of 4 hours 10 minutes, while heating the mixture to about 80° C. at a pressure of about 80 pounds per square inch gauge, in a reactor provided with a reflux column. The reaction mixture was then cooled, treated with aqueous sodium carbonate, and filtered. A portion (18.6 pounds) of the filtrate was fractionally distilled, whereby 4.73 pounds of unreacted chlorobenzene was recovered and 6.8 pounds of ethyl-chlorobenzene distilling principally at temperatures between 190° and 195° C. at atmospheric pressure, 2.4 pounds of diethyl chlorobenzene distilling principally at temperatures between 216° and 219° C. at atmospheric pressure, and 4.6 pounds of higher boiling products were obtained. The ethyl-chlorobenzene was a mixture of approximately 80 per cent meta-ethyl chlorobenzene and 20 per cent the ortho-isomer. The diethyl-chlorobenzene was likewise a mixture of isomers, but was rich in 3,5-diethyl-chlorobenzene. A mixture of 1324 grams (9.44 mols) of the above ethyl-chlorobenzene product, 3830 cubic centimeters of 28 per cent concentrated aqueous ammonia, and 270 grams of cuprous oxide was heated under pressure to 225° C. for 20 hours in a rotating bomb, after which the bomb was cooled and the charge removed. The reacted mixture separated into aqueous and organic layers on standing. The organic layer was removed, steam distilled, and the organic layer of the distillate was dried and fractionally distilled. There was obtained 567 grams (4.7 mols) of ethyl-aniline distilling principally at temperatures between 215° and 220° C. at atmospheric pressure. The ethyl-aniline product was a mixture of approximately 80 per cent meta-ethyl-aniline and 20 per cent ortho-ethyl-aniline. It was a colorless liquid boiling at approximately 214–5° C. at atmospheric pressure, freezing at a temperature below −55° C., and having a specific gravity of approximately 0.977 at 25° C. with respect to water at the same temperature. Said product, comprising a mixture of ortho- and meta-ethyl-anilines, was acetylated by reaction with an equal weight of 95 per cent pure acetic anhydride and the acetylated mixture was poured into ice water, whereupon ortho-ethyl-acetanilide crystallized on standing leaving the meta-ethyl-acetanilide in the form of an oil. The crystals and oil were separated and each was hydrolyzed to liberate the ethyl-aniline contained therein. Ortho-ethyl-aniline boiling at 213°–215° C. at atmospheric pressure and freezing at approximately −38° C. was recovered from the crystals and meta-ethyl-aniline boiling at 215°–217° C. and freezing at a temperature below −77° C. was recovered from the oil.

*Example 2*

A mixture of 812.5 grams (4.82 mols) of the diethyl-chlorobenzene from Example 1, 3900 cubic centimeters of 28 per cent aqueous ammonia, and 138 grams of cuprous oxide was heated to 225° C. in an autoclave for 48 hours, after which the autoclave was cooled, the charge removed and the product separated as in Example 1. There was obtained 403 grams (2.7 mols) of diethyl-aniline as a colorless liquid boiling principally at temperatures between 244.5 and 247° C. at 751 millimeters pressure, freezing at about −45° C., and having the specific gravity 0.950 at 25° C. The product was a mixture of isomeric diethyl-anilines, but was rich in 3,5-diethyl-aniline.

*Example 3*

A mixture of approximately 80 per cent meta-isopropyl-chlorobenzene and 20 per cent ortho-isopropyl-chlorobenzene was prepared by reacting propylene with chlorobenzene in accordance with the procedure described in Example 1. 400 grams (2.6 mols) of said isopropyl-chlorobenzene mixture, 2100 cubic centimeters of 28 per cent aqueous ammonia, and 74 grams of cuprous oxide were heated together under pressure in an autoclave with stirring at a temperature of about 225° C. for 20 hours. The autoclave was then cooled, the charge removed, and the isopropyl-aniline product was separated as in Example 1. There was obtained 170 grams (1.36 mols) of a mixture of about 80 per cent meta-isopropyl-aniline and 20 per cent orthoisopropyl-aniline as a colorless liquid boiling at approximately 224–5° C. at 745 millimeters pressure, freezing at a temperature below −35° C. and having a specific gravity of 0.961 at 25° C.

*Example 4*

A mixture of isomeric secondary-butyl-chlorobenzenes consisting of approximately 80 per cent of meta-butyl-chlorobenzene and 20 per cent of its ortho-isomer was prepared by reacting normal-butylene with chlorobenzene in accordance with the procedure described in Example 1. 177 grams of this secondary-butyl-chlorobenzene mixture, 452 cubic centimeters of 28 per cent aqueous ammonia solution, and 24 grams of cuprous oxide were heated together to a temperature of about 225° C. in a rotating bomb for 20 hours. The bomb was then cooled, the charge removed, and the product was separated as in Example 1. There was obtained 71 grams of a mixture of 80 per cent meta-secondary-butyl-aniline and 20 per cent ortho-secondary-butyl-aniline as a colorless liquid boiling principally at 242–3° C. at 749 millimeters pressure, freezing at a temperature below —28° C., and having the specific gravity 0.944 at 25° C.

The invention may be practiced in ways other than those illustrated in the foregoing examples. For instance, an alkyl halide, instead of an olefine, may be employed as a reactant in forming the meta-alkyl-halobenzene intermediate product from which the desired meta-alkyl-aniline is obtained. By using an alkyl halide, such as ethyl chloride, isopropyl chloride, tertiary butyl chloride, etc., a meta-alkyl-halobenzene is obtained which may be ammonolyzed to yield the corresponding meta-alkyl-aniline, e. g. meta-ethyl-aniline, meta-isopropyl-aniline, meta-tertiary-butyl-aniline, etc. The invention, accordingly, provides a convenient and economical method for preparing a wide variety of nuclear alkylated anilines having a primary-alkyl, secondary-alkyl, or tertiary-alkyl radical in the meta position relative to the amino group.

Other modes of applying the principle of the invention may be employed instead of those explained, change being made as regards the method herein disclosed, provided the step or steps stated by any of the following claims or the equivalent of such stated step or steps be employed.

I therefore particularly point out and distinctly claim as my invention:

1. The method which comprises reacting an alkylated halobenzene, having an alkyl radical in a position meta to the halogen atom, with ammonia to form the corresponding nuclear alkylated aniline.

2. The method of making a nuclear alkylated aniline having an alkyl radical in a position meta to the amino group, which comprises alkylating a halobenzene by reaction with an alkylating agent selected from the class consisting of olefines and alkyl halides and reacting the alkylated halobenzene with ammonia.

3. The method which comprises reacting a meta-mono-alkyl-halobenzene with ammonia to form the corresponding meta-alkyl-aniline.

4. The method which comprises alkylating a halobenzene by reaction in the presence of a Friedel-Craft catalyst with an alkylating agent selected from the class consisting of olefines and alkyl halides to form a mixture of isomeric mono-alkyl-halobenzenes comprising the meta isomer, and reacting said monoalkyl-halobenzenes with ammonia in the presence of a copper-containing catalyst and a substantially inert solvent, said reaction with ammonia being carried out at a temperature between about 150° C. and about 250° C. and at a pressure approximately equivalent to the combined vapor pressures of the reactants and products at the reaction temperature.

5. In a method of making meta-ethyl-aniline, the step which consists in reacting a meta-ethyl-halobenzene with ammonia.

6. In a method of making meta-ethyl-aniline, the steps which consist in ethylating chlorobenzene to form meta-ethyl-chlorobenzene and reacting the latter with ammonia.

7. In a method of making 3,5-diethyl-aniline, the step which consists in reacting a 3,5-diethyl-halobenzene with ammonia.

8. In a method of making 3,5-diethyl-aniline, the steps which consist in ethylating chlorobenzene to form 3,5-diethyl-chlorobenzene and reacting the latter with ammonia.

9. In a method of making meta-isopropyl-aniline, the step which consists in reacting a meta-isopropyl-halobenzene with ammonia.

10. In a method of making meta-isopropyl-aniline, the steps which consist in reacting chlorobenzene with propylene to form meta-isopropyl-chlorobenzene and reacting the latter with ammonia.

ROBERT R. DREISBACH.